United States Patent [19]

Benden

[11] Patent Number: 5,140,694

[45] Date of Patent: Aug. 18, 1992

[54] ANTI-INTRUSION DEFEATOR AND LOCATOR FOR COMMUNICATION SATELLITES

[75] Inventor: William J. Benden, Freehold, N.J.

[73] Assignee: AT&T Bell Laboratories, Murray Hill, N.J.

[21] Appl. No.: 397,229

[22] Filed: Aug. 23, 1989

[51] Int. Cl.⁵ ............................ H04B 1/10; H04B 7/185
[52] U.S. Cl. .................................... 455/12.1; 342/352; 455/295; 455/296
[58] Field of Search ...................... 455/12, 13, 295, 296, 455/303, 133, 140, 278; 342/352, 354, 378, 383, 384; 370/104.1

[56] References Cited

U.S. PATENT DOCUMENTS

| 4,090,199 | 5/1978 | Archer | 343/100 SA |
| 4,144,495 | 3/1979 | Metzger | 455/12 |
| 4,561,067 | 12/1985 | McKeown | 364/819 |
| 4,612,546 | 9/1986 | Rosen | 343/352 |
| 4,651,157 | 3/1987 | Gray et al. | 342/457 |
| 4,667,203 | 5/1987 | Counselman | 342/357 |
| 4,717,919 | 1/1988 | Cherrette et al. | 342/383 |

FOREIGN PATENT DOCUMENTS

2506101 11/1982 France.

OTHER PUBLICATIONS

Hoernig et al., *Milcom '84*, Los Angeles, Calif., Oct. 1984, vol. 2, pp. 197-200.
DeCristofaro et al., *ICC '86*, Toronto, Canada, Jun., 1986, vol. 2, pp. 1088-1092.
Sheets et al., *Radio Electronics*, vol. 57, No. 10, Oct. 1986, pp. 47-49, 80.

*Primary Examiner*—Reinhard J. Eisenzopf
*Assistant Examiner*—Chi H. Pham
*Attorney, Agent, or Firm*—E. S. Indyk

[57] ABSTRACT

The present invention relates to an economical yet effective technique for locating and defeating intentional or unintentional interfering signals transmitted to a commercial communications satellite on a channel-by-channel basis. The satellite arrangement includes a first and a second configuration of hybrids and Variable Power Combiners (VPCs), respectively, that concurrently combine the channels received from a plurality of ground regions for delivery to at least one input multiplexer. In one arrangement, the corresponding channel outputs from the at least one input multiplexer, are each connected to a different input of a separate Single Pole Double Throw (SPDT) switch. Channel switching is accomplished by transmitting commands to the VPCs and SPDT switches from a command earth station. Noting the presence or absence of the interfering signal for a given channel switch and VPC setting will provide the location of the interferer and the elimination of the interfering signal.

4 Claims, 4 Drawing Sheets

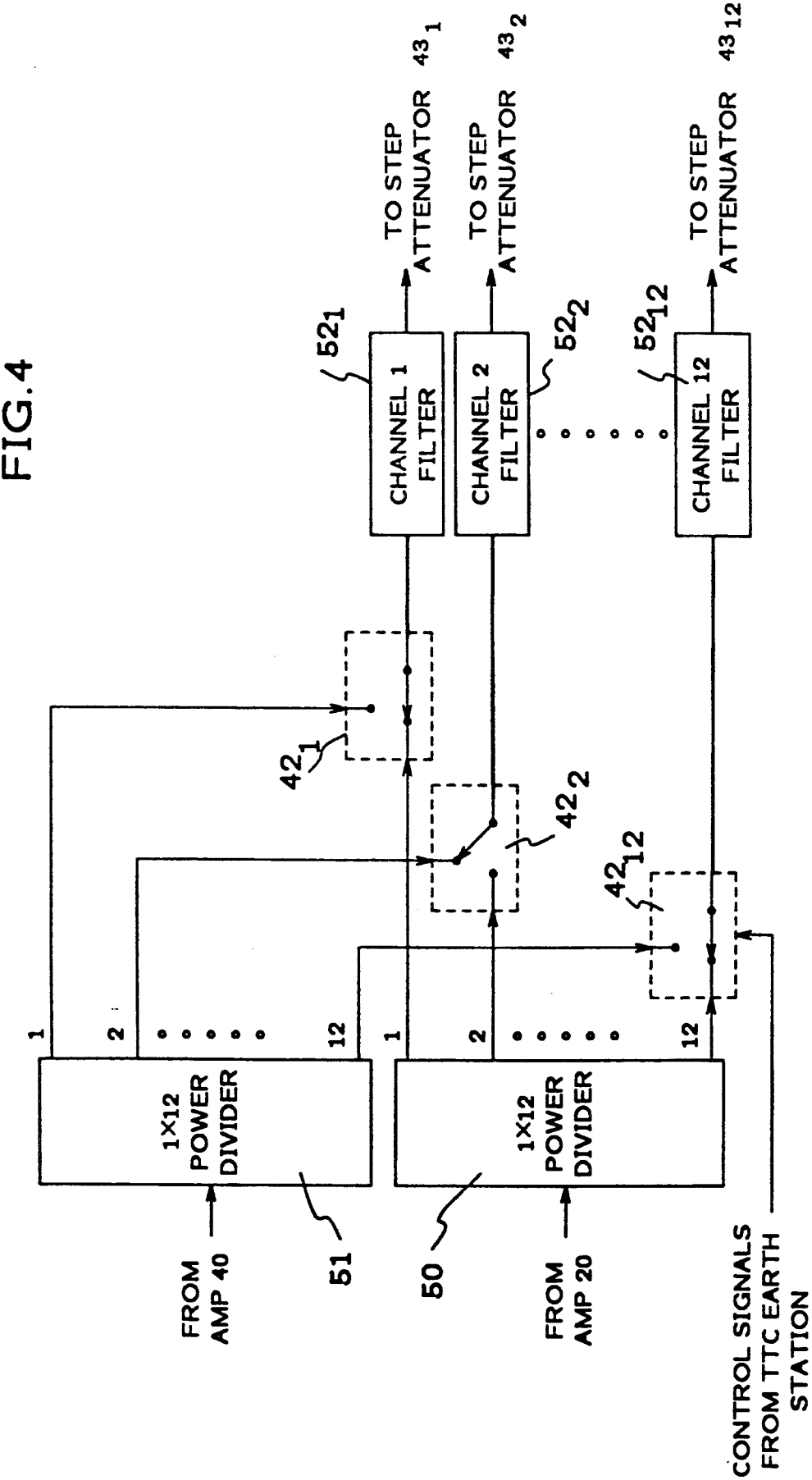

ANTI-INTRUSION DEFEATOR AND LOCATOR FOR COMMUNICATION SATELLITES

TECHNICAL FIELD

The present invention relates to method and apparatus for defeating and locating intentional or unintentional intrusion or interfering signals transmitted to a communication satellite on a channel-by-channel basis.

DESCRIPTION OF THE PRIOR ART

In satellite communication systems, it has always been a concern to provide secure message and/or control signals between ground stations. Various techniques have been provided to ensure such secure communications. For example, messages have been sent using encryption or spread spectrum techniques to prevent a non-destined user from freely receiving the message. Such techniques may be highly desirable for military satellite systems, but tend to be too costly and unnecessarily complicated for commercial satellite systems.

In U.S. Pat. No. 4,612,546, issued to H. A. Rosen on Sep. 16, 1986, a system is disclosed for the protection of the command link of ground-controlled beacon tracking satellites where means are included for detecting the amplitude and/or phase modulation of a composite signal which results from the beating of an intruder's carrier signal with an up-link beacon. In this system, a bandpass filter is included for guaranteeing that the low-frequency sweep of the beacon signal and the high-frequency data communication signals are passed through the respective receivers without interference. The resulting output of the bandpass filter allows detection of the intruder's carrier signal. Such signal detection is used to deactivate certain control mechanisms of the satellite whenever an intruder signal is detected which is within a predetermined power range of the beacon tracking signal or nearing the saturation limits of the amplifier of the satellite command receiver.

In recent times, the satellite communications industry has also been concerned with the taking over of a satellite transponder channel by an intruder who had sufficient transmitter power, for example, to display a message instead of a particular television program being transmitted on that channel. In this regard see the article by W. Sweets et al. in *Radio Electronics*, Vol. 57, No. 10 October 1986, at pages 47-49, 80. In the military area, this type of intrusion or jamming of a channel could be combatted by very sophisticated methods which are very expensive and, therefore, do not lend themselves for use in Commercial Communication Satellites where system costs are extremely important and where, generally, the threat of intrusion is not as severe.

The problem remaining in the prior art is to provide an inexpensive, lightweight, low-power consumption technique for combating what may be described as an intentional up-link interference. Since up-links, for a given transponder channel, may originate from any location in the coverage area, it is highly desirable to accomplish this on a channel-by-channel basis. The technique may also be effective against unintentional or accidental interference as may occur in a quick set-up of transportable earth stations as used for, for example, in Satellite News Gathering.

SUMMARY OF THE INVENTION

The foregoing problem in the prior art has been solved in accordance with the present invention, which relates to a low-cost, lightweight, low-power consuming, anti-intrusion defeator and locator for communication satellites which is able to inhibit an intentional up-link interferer on a channel-by-channel basis, and be effective against unintentional or accidental interference which would occur in the quick set-up of a transportable earth station. The arrangement comprises a first configuration of hybrids that combine the beams to a first input multiplexer arrangement, and a second similar configuration of Variable Power Combiners (VPCs), or similar switching devices, that combine the beams to a second input multiplexer arrangement. The corresponding channel outputs from the first and second input multiplexer arrangements are connected to separate inputs of a separate Single Pole Double Throw (SPDT) switch provided for each channel. Receive-beam switching is accomplished by transmitting commands to the satellite from a receive-beam control station. These commands operate the individual VPCs and SPDT switches which are associated with a respective beam or channel. By noting the presence or absence, or partial presence or absence, of the interferer for a given beam/switch combination allows for the location and elimination of the interferer, since each receive-beam is designed to cover a specific geographical area.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

FIG. 4 is a block diagram of an alternative arrangement of the input multiplexing section of FIG. 3.

DETAILED DESCRIPTION

Figure 2:
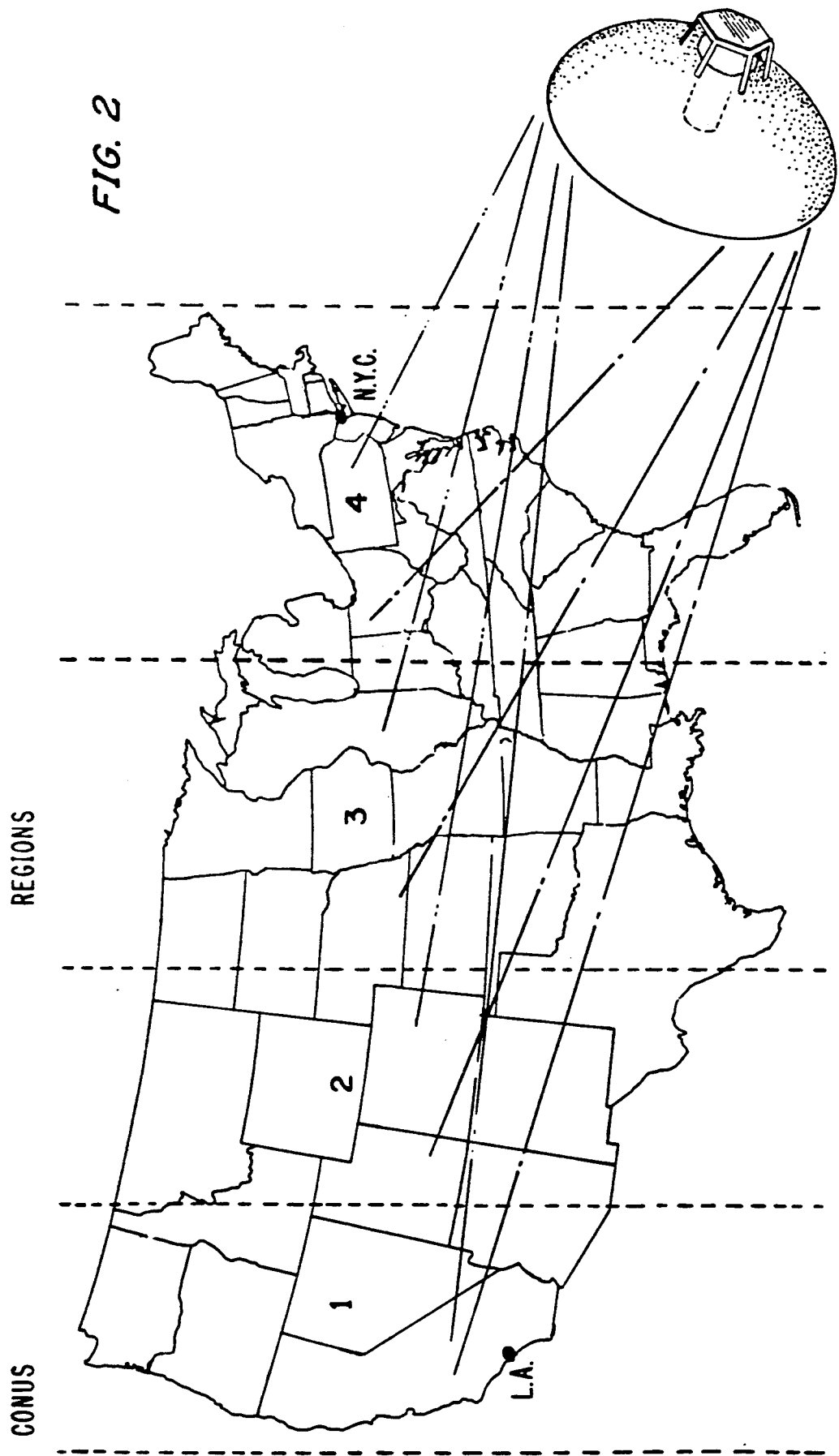
FIG. 2 is a exemplary coverage of the four beams of FIG. 1 on the contiguous United States.

For typical satellite communication systems, the satellite antenna system covers one or more regions of a predetermined earth service area with a single or a plurality of separate antenna feed horns, respectively. For a typical satellite covering the Contiguous United States (CONUS) with, for example, a plurality of feed horns, the antenna system might include, for example, four antenna feed horns which each cover a separate region of the United States. For example, as shown in FIG. 2, region 1 might cover the western United States from Alaska to Mexico, region 4 might cover the eastern United States from Canada through Florida, with regions 2 and 3 covering the remaining separate areas of the United States between the first and fourth regions so as to cover the whole United States with four beams. Gain contours for each beam are such that there are areas at the borders of two adjacent regions where a signal transmitted from an earth station located on this border will be received with equal strength at the two associated feed horns. The description which follows is directed to a satellite system with four antenna feed horns as described for FIG. 2, but it should be understood that the present invention can be used in a satellite which has any number of feed horns or subsets of feed horns for covering more or less than four separate areas or subregions of a predetermined service area.

Figure 1:
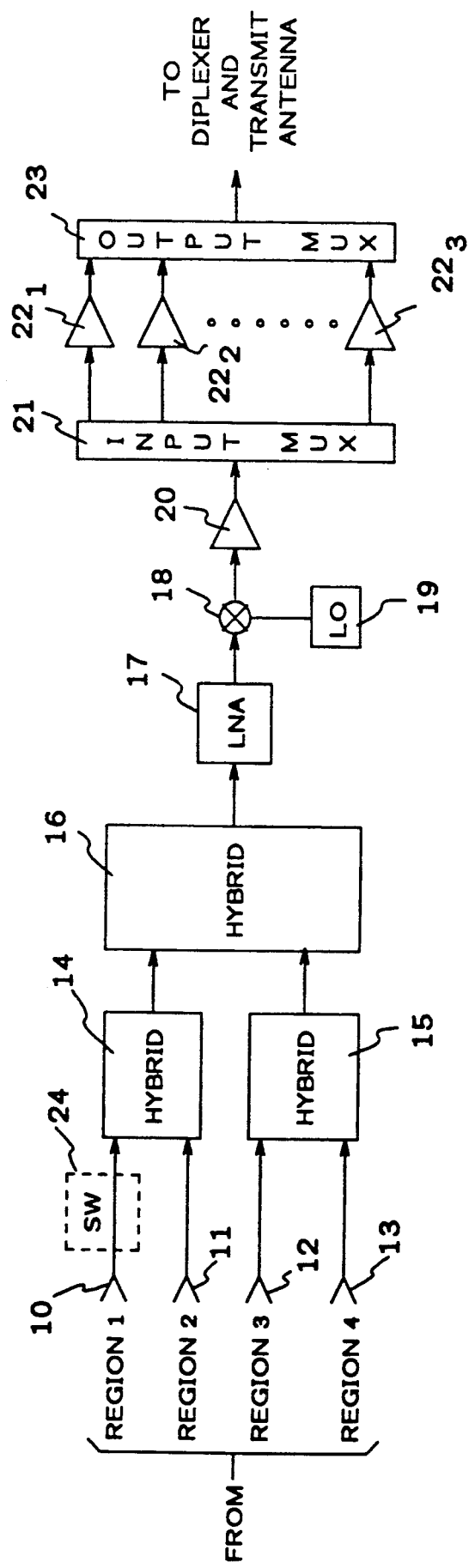
FIG. 1 is a transponder block diagram of an exemplary prior art arrangement of a satellite including four exemplary receive-beams which cover four separate regions.

FIG. 1 illustrates a typical exemplary satellite arrangement which is capable of handling, for example, up to a total of 12 simultaneous channel signals, on a single polarization, from the four regions 1–4 shown in FIG. 2. In FIG. 1, channel signals from earth stations in region 1 are received at feed horn 10; channel signals from earth stations in region 2 are received at feed horn 11; channel signals from earth stations in region 3 are received at feed horn 12; and channel signals from earth stations in region 4 are received at feed horn 13. It is to be understood that the channel signals from any one region may include from 0–12 simultaneous channel signals, but that the total number of simultaneous transponder channel signals from all four regions may not exceed the 12 channel satellite capacity in this exemplary arrangement. For purposes of discussion, the 12 exemplary channels are transmitted to the satellite in separate frequency bands to permit transmission to and from the satellite, and multiplexing in the satellite, without interference between channels.

In FIG. 1, the channel signals from regions 1 and 2 are received at feed horns 10 and 11 and are provided to separate inputs of a hybrid 14 which combines the channel signals from the two regions into a single output signal. Similarly, the channel signals from regions 3 and 4 which are received at feed horns 12 and 13 are provided to separate inputs of a second hybrid 15 which combines the channel signals from the two regions into a single output signal. The combined output signals from each of hybrids 14 and 15 are provided as separate input signals to a third hybrid 16 which combines the channel signals from the four regions into a single output signal for the entire service area in a typical mode of operation. The output signal from hybrid 16 is provided as an input to a Low Noise Amplifier (LNA) 17 which functions to amplify the 12 received channels while adding very little noise.

The output signal from LNA 17 is transmitted to the input of a mixer 18 which translates the frequency of the input signal from LNA 17 with a carrier generated by a local oscillator 19 to generate an output signal comprising the received channel signals in a predetermined translated RF transmission frequency band. For example, the input signal to mixer 18 may be in the 6 GHz frequency band, while the output signal may be in the 4 GHz frequency band. The output RF signal from mixer 18 is amplified in amplifier 20 and provided as an input signal to an input multiplexer 21. Input multiplexer 21 functions to separate the 12 channels received from the four regions for propagation along separate paths. Each of the received channel signals 1-12 is amplified in a separate one of power amplifier $22_1$ to $22_{12}$ and is provided as a separate channel input signal to an output multiplexer 23. Output multiplexer 23 functions to multiplex or combine the 12 channels signals into a single output signal for transmission to a diplexer and transmit antenna system (not shown) where the channel signals are transmitted to the earth stations in the four CONUS or United States regions. It should be understood that the diplexer and transmit antenna system of the satellite can be implemented using any suitable arrangement of, for example, an area coverage beam or using the four feed horns 10–13. Other selective switching techniques could also be employed if some of the 12 channels were to be transmitted from only certain regions, thereby isolating other regions.

For purposes of illustration hereinafter, it will be assumed that a desired channel 2 signal is being transmitted from the New York area in region 4 to the satellite receive feed horn 13, and an interferer is simultaneously transmitting a signal in channel 2 from the Los Angeles area in region 1 to the satellite receive feed horn 10. It will also be assumed hereinafter that region 1 is also simultaneously transmitting desired signals in channels 4 and 7 to satellite receive feed horn 10. In the typical exemplary system of FIG. 1, the interferer's channel 2 signal, along with the desired channel 4 and 7 signals, received at feed horn 10 would be combined in hybrid 14 with the other channel signals received at feed horn 11 from region 2. Similarly, the channel signals from regions 3 and 4 received at feed horns 12 and 13, including the desired channel 2 signal from region 4, are combined in hybrid 15. The combined output signals from hybrids 14 and 15 would be further combined with each other in hybrid 16 and transmitted through LNA 17, mixer 18, amplifier 20 and input multiplexer 21.

The channel 2 output signal from input multiplexer 21 would include both the desired New York area signal and the unwanted interfering signal from the Los Angeles area. Such combined channel 2 signals would be transmitted via amplifier $22_2$, output multiplexer 23 and the diplexer and transmit antenna to all ground stations destined to receive channel 2. One technique for preventing the interferer's channel 2 signal from interfering with the desired channel 2 would be to open a switch 24 disposed in the input path to hybrid 14 from feed horn 10. Such switch 24, however, would not only prevent the interferer's channel 2 signal from being transmitted through the satellite, it would also prevent the desired channel 4 and 7 signals from region 1 from passing through the satellite, which would not be a desirable result. Therefore, the satellite configuration of FIG. 1 might locate an interferere, but would not defeat an interferer without interrupting the transmission of desired channel signals.

Figure 3:
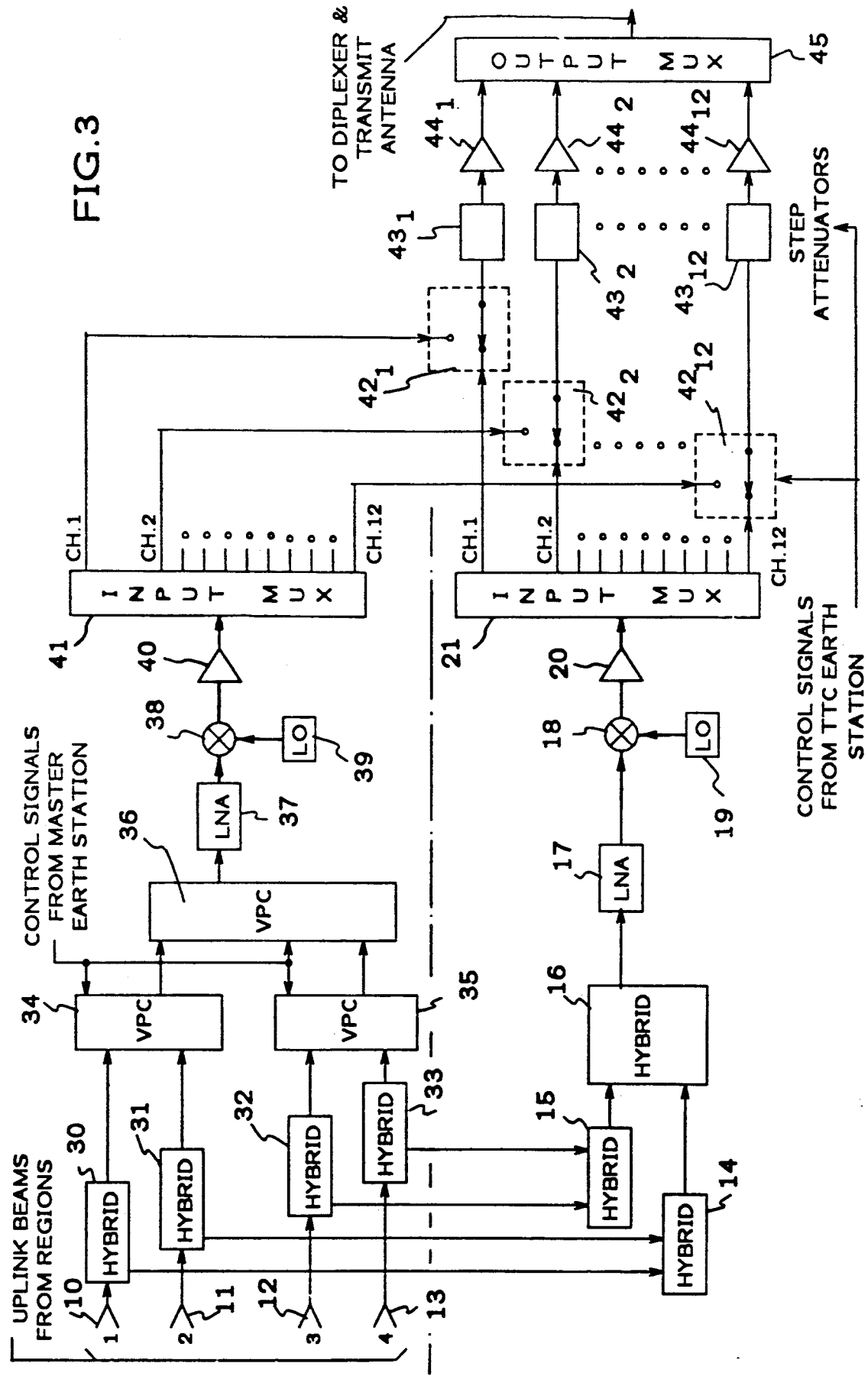
FIG. 3 is a block diagram of an exemplary arrangement of a satellite in accordance with the present invention which is a modification of the arrangement of FIG. 1.

FIG. 3 shows a modification of the satellite system of FIG. 1 in accordance with the present invention to provide both the location of an interferer, and the capability to remove such interferer's channel signal on a channel-by-channel basis, if the interferer's channel signal is not being transmitted from the same region as the corresponding desired channel signal. Under the condition where the interfering and desired channel signal arrive from a same region, the interferer's signal can be located and an alternative means is required to possibly reduce the interference created by the interferer's signal. In FIG. 3, instead of the channel signal received at feed horns 10 and 11 being transmitted directly to a separate input of hybrid 14, these first and second grouped channel signals are provided as input signals to hybrids 30 and 31, respectively. Similarly the channel signals received at feed horns 12 and 13 are provided as input signals to hybrids 32 and 33, respectively. Each of hybrids 30 and 31 divides the associated groups of channel signals from feed horns 10 and 11, respectively, into fractional parts and transmits a first part of each signal group to a separate input of a first Variable Power Combiner (VPC) 34, and a second part of each signal group to a separate input of hybrid 14. The fractional parts of hybrids 30-33 can be adjusted for the desired Gain-to-Temperature ratio (G/T). Similarly, each of hybrids 32 and 33 divdes the associated channel signal from feed horns 12 and 13, respectively, into fractional parts and transmits a first part to a separate input of a second VPC 35, and a second part to a separate input of hybrid 15. Each of hybrids 14 and 15 function as described hereinbefore and transmit their output signals to a third hybrid 16, which combines the two RF input signals and transmits the output signal through a LNA 17, mixer 18 (associated with Local Oscillator 19), amplifier 20 to input multiplexer 21. These elements are shown below the dashed line in FIG. 3 and function as described hereinbefore for the correspondingly numbered elements of FIG. 1.

In the parallel transmission section provided in accordance with the present invention, the outputs from VPCs 34 and 35 are provided as separate inputs to a VPC 36. Each of the VPCs 34-36 function as a variable power summer that can each selectively provide an output RF signal which is equal to (1) the sum of the two input signals, or (2) only one or none of the two input signals in response to command signals from a Telemetry, Tracking and Command (TT&C) earth station. It is to be understood that any other suitable device may be used for each of VPCs 34-36 which will provide a similar function. The output from VPC 36 is transmitted through LNA 37, mixer 38 (associated with a local oscillator 39), and amplifier 40 to input multiplexer 41, where elements 37-41 provide functions which are similar to the functioning of elements 17-21 in FIG. 1. The corresponding channel outputs from input multiplexers 21 and 41 are transmitted to separate inputs of a switch $42_1$ to $42_{12}$, respectively. More particularly, the channel 1 output from input multiplexers 21 and 41 is terminated at separate inputs of SPDT switch $42_1$; the channel 2 output from input multiplexers 21 and 41 is terminated at separate inputs of SPDT switch $42_2$; and continuing in the same manner up to the channel 12 output from input multiplexers 21 and 41 being terminated on separate inputs of SPDT switch $42_{12}$. Each of switches $42_1$ to $42_{12}$ is controlled via control signals from the TT&C earth station to permit an associated channel signal from either input multiplexer 21 or 41 to be directed to the output of that switch. The output signals from switches $42_1$ to $42_{12}$ are transmitted through optional step attenuators $43_1$ to $43_{12}$, respectively, and then through respective power amplifiers $44_1$ to $44_{12}$ to separate inputs of an output multiplexer 45. Step attenuators are also controlled from a TT&C ground station and are known for helping combat an interferer's signal of lower magnitude than the desired channel signal in either FIGS. 1 or 3 by attenuating the desired and interfering signal to a point where the interfering signal is no longer a problem. Such use of step attenuators, however, generally requires higher and higher power transmitters at the earth stations (the so-called power battle) of the communication system to ensure that the desired channel signal is of proper strength after satellite processing and attenuating a channel signal. The step attenuators would then be useful for combating an interferer's channel signal transmitted from the same region as the desired channel signal. The single output signal from output multiplexer 45, including the 12 multiplexed channel signals, is transmitted to a diplexer arrangement (not shown) and the transmit antenna system (also not shown) for transmission back to the earth stations of the communication system.

In operation, without an interferer's signal, each of switches $42_1$ to $42_{12}$ will be set to pass the associated output channel signal from input multiplexer 21 in a normal fashion. Once an interferer's channel signal is detected as interfering with, for example, a desired channel 2 signal emanating from the New York area in region 4, the following exemplary procedure is performed. First, with the initial state of VPCs 34-36 arranged to transmit combined signals from the input ports, switch $42_2$ is switched to only pass the channel 2 signal from input multiplexer 41. At this time the channel 2 signals from receive feed horns 10 and 13 are combined via hybrids 30 and 33, and VPCs 34-36. Second, VPCs 36 and 35 are commanded to pass only the signals from receive feed horn 13 and block the signals from hybrid 32 and VPC 34. This can be done immediately, since the location of the desired signal is known a priori. This will in most cases eliminate the interferer's channel 2 signal, since all regions have been blocked through input multiplexer 41 except for the region of the desired signal. The undesired channel 2 signal does pass through hybrids 30, 14 and 16, LNA 17, Mixer 18, amplifier 20 and input multiplexer 21, but is blocked at switch $42_2$. By commanding various states of VPCs 34, 35 and 36, the location of the interferer can be deduced. For example, VPC 35 could be commanded to combine the signals from hybrids 32 and 33, and if the interferer's signal does not appear at the output, then the hybrid 31 output signal can be fed directly through VPC 34 and combined in VPC 36. If the interferer's signal still does not appear, the VPC 34 can be commanded to feed the hybrid 30 output signal straight through for combining in VPC 36. Since only the output signal from hybrids 31-33 is combined in VPC 36 without the presence of the interferer's channel 2 signal, it can be deduced that the interferer's signal is being transmitted from region 1.

If the various states of VPCs 34-36 are commanded, and it is determined that the interfering channel 2 signal is being transmitted from a boundary area between two or more regions and received concurrently at two or more of the receive feed horns 10-13, then the interferer's location can be determined by noting which inputs to VPCs 34-36 cause the blocking of the interferer's signal at the output of VPC 36. If, on the other hand, the interfering channel 2 signal is being transmitted from the same region as the desired channel 2 signal, other steps can be invoked as mentioned hereinbefore using a step attenuator $43_i$ and possible increased power transmission at the ground station transmitting the desired channel 2 signal.

It should be noted that all other channel signals, including the channel 4 and 7 signals from region 1, still reach output multiplexer 45 in a conventional way via hybrids 14-16, input multiplexer 21 and switches $42_1$ and $42_3$-$42_{12}$ which are set to pass the output signals from input multiplexer 21 to output multiplexer 45. In this manner all channels not being interfered with are still being transmitted, even if they come from the same region as the interfering signal, while only the desired channel signal being interfered with is being transmitted without interference via VPCs 34-36, input multiplexer 41, switch $42_2$ and output multiplexer 45. As stated hereinbefore, for the case where an interferer's channel signal and a desired channel signal are being transmitted from a same region, the selective application of the proper step attenuator 43$_i$ and increased power transmission of the desired channel 2 signal from region 4 might be required.

It is to be understood that the above-described embodiments are simply illustrative of the principles of the invention. Various other modifications and changes may be made by those skilled in the art which will embody the principles of the invention and fall within the spirit and scope thereof. More particularly, the principles of the present invention do not necessarily require the demultiplexing of all channels in both demultiplexers 21 and 41. Rather, the locating and defeating of an interferer can be performed by simply combining the received channel signals and input multiplexing all of the non-interfered with channel signals as shown in FIG. 1 or the bottom half of FIG. 3 while concurrently testing to find the regions including each of the desired and interfering channel signals. Once the region or regions including each of the interfering and desired channel signals are known, the channels from the region or regions including the interfering channel signal can be effectively discarded in the second section of the satellite and only the desired channel signal in the remaining beam needs to be input multiplexed in second input multiplexer 41 to obtain an interference-free desired channel signal for transmission back to the ground service areas with all of the remaining non-interfered with channels from the first demultiplexing operation.

FIG. 4 shows an alternative, lighter weight, arrangement for the input multiplexers 21 and 41 and switches 42$_1$ to 42$_{12}$. In FIG. 4, the output of combined RF channel signals from amplifiers 20 and 40 are provided as inputs to 1X12 power dividers 50 and 51, respectively. The 12 combined RF output signals from each of power dividers 50 and 51 are coupled to separate input terminals of switches 42$_1$ to 42$_{12}$. The output from each of switches 42$_1$ to 42$_{12}$ is transmitted through channel filters 52$_1$ to 52$_{12}$, respectively, which are tuned to only pass each channel frequency band corresponding to channels 1–12. Channel filters 52$_1$ to 52$_{12}$ perform the same multiplexing operation as input multiplexers 21 or 41. In this manner the combined RF channel signals are provided at each input of switches 42, and the TT&C earth station controls which of the signals from power dividers 50 or 51 passes through the associated switch 42 and channel filter 52.

I claim:

1. A method of locating and defeating a channel signal interfering with a desired channel signal in a satellite communication system comprising:
    (a) receiving a plurality of channel signals from a plurality of ground regions, the said plurality of channel signals comprising (i) a desired first channel signal in a first frequency band received from a first ground region, and (ii) an interfering second channel signal in the said first frequency band from a second ground region;
    (b) generating a first combined output signal by combining the channel signals received from the plurality of ground regions;
    (c) generating cyclically second combined output signals by selectively combining the signals received from ground regions other than the ground region from which the desired channel signal originates until the interfering channel signal is not included in the second combined output signal while the desired channel signal is included in the second combined output signal, or it is determined that both the interfering and desired channel signals are received from the same region;
    (d) separately multiplexing each of the first and second combined output signals to generate first and second input multiplexed channel output signals; and
    (e) selectively transmitting (i) one of each of the corresponding input multiplexed channel signals from either the first or second combined output signals back to the satellite service area when no interfering channel signal is detected and (ii) selectively transmitting the input multiplexed channel output signals from the second input multiplexed channel output signal obtained in step (d) for any channel signal that is in the same frequency band as the interfering channel signal, while transmitting the output channel signals of all other channels from either the first or second combined output signals back to the satellite service area.

2. The method of claim 1 wherein
    (a) the second combined output signal is generated by disposing a plurality of Variable Power Combiners (VPCs) in a tree-type arrangement for selectively switching, to an output of the VPC, a first and a second input, said first and second inputs including separate sets of at least one received signal from a ground region; and
    (b) in performing step (b),
        (b1) combining all of the signals received at the first and second inputs of each of the VPCs when no interfering channel signal is present from the plurality of ground regions; and
        (b2) cyclically switching, when an interfering channel signal is received from a first ground region, the VPCs receiving signals from only a single ground region so that a different one of the received ground region signals is prevented from being combined into the second combined output signal during a switching sequence; and
        (b3) repeating step (b2) until either the interfering channel signal from the first ground region is not included in the second combined output signal, or all of the signals from the plurality of ground regions other than those originating from the ground region in which the desired signal originates, have been prevented during at least one cycle from being combined in the second combined output signal.

3. The method according to claim 1 wherein when it is determined in step (c) that the desired and interfering channel signals are received at the satellite from a same ground region, then in performing step (e) performing the substeps of:
    (c1) attenuating the input multiplexed channel output signal including both a desired and an interfering channel signal in predetermined steps until the desired and interfering channel signals are of a magnitude where the effect of the interfering channel signal is negligible; and
    (c2) transmitting all of the channel output signals back to the satellite service area.

4. The method according to claim 1 wherein in performing step (c) initially blocking any channel signal in a same frequency band as the received desired channel being interfered with from all regions except the region from which the desired channel signal is being received.

* * * * *